United States Patent
Tang

(10) Patent No.: US 9,961,070 B2
(45) Date of Patent: May 1, 2018

(54) STRONG AUTHENTICATION WITH FEEDER ROBOT IN A FEDERATED IDENTITY WEB ENVIRONMENT

(71) Applicant: DRFIRST.COM, INC., Rockville, MD (US)

(72) Inventor: Zilong Tang, Rockville, MD (US)

(73) Assignee: DrFirst.com, Inc., Rockville, MD (US)

( * ) Notice: Subject to any disclaimer, the term of this patent is extended or adjusted under 35 U.S.C. 154(b) by 331 days.

(21) Appl. No.: 14/851,708

(22) Filed: Sep. 11, 2015

(65) Prior Publication Data

US 2017/0078270 A1  Mar. 16, 2017

(51) Int. Cl.
*H04L 29/06* (2006.01)
(52) U.S. Cl.
CPC ........ *H04L 63/0815* (2013.01); *H04L 63/083* (2013.01); *H04L 63/0853* (2013.01); *H04L 63/0861* (2013.01); *H04L 63/123* (2013.01); *H04L 2463/082* (2013.01)
(58) Field of Classification Search
CPC ............. H04L 63/0815; H04L 63/0853; H04L 63/123; G06Q 50/22; G06F 7/06
See application file for complete search history.

(56) References Cited

U.S. PATENT DOCUMENTS

| | | | |
|---|---|---|---|
| 6,192,380 B1 * | 2/2001 | Light | G06F 17/243 707/999.009 |
| 6,564,247 B1 | 5/2003 | Todorov | |
| 7,441,263 B1 | 10/2008 | Bakshi et al. | |
| 7,761,500 B1 | 7/2010 | Eckert et al. | |
| 7,818,792 B2 | 10/2010 | Shamsaasef et al. | |
| 9,183,376 B2 | 11/2015 | Shinoda | |
| 2003/0115142 A1 | 6/2003 | Brickell et al. | |
| 2006/0129816 A1 | 6/2006 | Hinton | |
| 2007/0156601 A1 | 7/2007 | Brew et al. | |
| 2007/0174454 A1 | 7/2007 | Mitchell et al. | |
| 2007/0294399 A1 | 12/2007 | Grossner et al. | |
| 2008/0270612 A1 | 10/2008 | Malakapalli et al. | |
| 2009/0019534 A1 | 1/2009 | Bakshi et al. | |
| 2009/0055642 A1 | 2/2009 | Myers et al. | |
| 2009/0064307 A1 | 3/2009 | Holar et al. | |
| 2009/0122979 A1 | 5/2009 | Lee et al. | |
| 2009/0328196 A1 | 12/2009 | Bovee | |

(Continued)

*Primary Examiner* — Wasika Nipa
(74) *Attorney, Agent, or Firm* — Brake Hughes Bellermann LLP

(57) ABSTRACT

Method, system, and programs for performing two-factor authentication for a controlled access application via one or more third-party host verification servers. An example method includes receiving a request to a controlled access application after a user has successfully logged into an enterprise system with a first Identifier (ID) factor, the controlled access application requiring additional authentication with a second ID factor, obtaining first information to complete the second ID factor, at least some of the first information being obtained from the user, and generating a first web form using the first information. The method also includes submitting the first web form to a host verification server, receiving an indication of successful verification from the host verification server; and initiating, in response to receiving the indication of successful verification, access to the controlled access application.

23 Claims, 7 Drawing Sheets

(56) References Cited

U.S. PATENT DOCUMENTS

| | | |
|---|---|---|
| 2011/0014897 A1 | 1/2011 | Finucan |
| 2011/0078439 A1 | 3/2011 | Mao et al. |
| 2011/0107408 A1 | 5/2011 | Blot-Lefevre |
| 2011/0154443 A1 | 6/2011 | Thakur et al. |
| 2011/0231280 A1 | 9/2011 | Farah |
| 2011/0270909 A1 | 11/2011 | Fu |
| 2012/0041889 A1 | 2/2012 | Morrison et al. |
| 2012/0185398 A1 | 7/2012 | Nets et al. |
| 2012/0227098 A1 | 9/2012 | Obasanjo et al. |
| 2012/0272335 A1 | 10/2012 | Mahendrakar et al. |
| 2013/0041678 A1 | 2/2013 | Tayal et al. |
| 2013/0152183 A1 | 6/2013 | Plewnia et al. |
| 2013/0191137 A1 | 7/2013 | Chen et al. |
| 2013/0191138 A1 | 7/2013 | Chen et al. |
| 2013/0191139 A1* | 7/2013 | Chen .................. G06F 19/3456 705/2 |
| 2013/0246081 A1 | 9/2013 | Auer et al. |
| 2013/0246082 A1 | 9/2013 | Brylawski et al. |
| 2013/0311205 A1 | 11/2013 | Creswell et al. |
| 2013/0336315 A1 | 12/2013 | Guichard et al. |
| 2014/0173408 A1 | 6/2014 | Canaud et al. |
| 2014/0244318 A1 | 8/2014 | Drake et al. |
| 2014/0310173 A1 | 10/2014 | Caldwell |
| 2014/0344153 A1 | 11/2014 | Raj et al. |
| 2015/0310176 A1 | 10/2015 | Chen et al. |
| 2016/0055313 A1 | 2/2016 | Sellars |
| 2016/0063239 A1 | 3/2016 | Chen et al. |
| 2016/0063657 A1 | 3/2016 | Chen et al. |
| 2016/0065552 A1 | 3/2016 | Chen et al. |
| 2016/0065579 A1 | 3/2016 | Chen et al. |
| 2016/0055302 A1 | 5/2016 | Sellars |
| 2017/0177796 A1 | 6/2017 | Sellars |
| 2017/0235890 A1 | 8/2017 | Chen et al. |

* cited by examiner

STRONG AUTHENTICATION WITH FEEDER ROBOT IN A FEDERATED IDENTITY WEB ENVIRONMENT

TECHNICAL FIELD

The present teaching relates to methods, systems and programming for web-based software applications. Particularly, the present teaching is directed to methods, systems, and programming for establishing strong authentication for an existing web-based application.

BACKGROUND

Healthcare organizations often provide functionality that, by regulation, must be protected by strong authentication requirements to ensure controlled access to the information and functionality. To access such functionality, a user is therefore required to create and remember login credentials for the healthcare organization, in addition to various other login credentials. This can be a frustrating experience for the user.

SUMMARY

The teachings disclosed herein relate to methods, systems, and programming for integrating a third-party authentication process into a controlled access application to ensure compliance with mandated levels of access while minimizing Identifier (ID) factors associated with a user. Implementations provide a transparent way to integrate an existing third-party authentication process into an application that requires enhanced security. By using an existing third-party authentication process that meets a specified standard, access to the controlled access application also falls under the standard. Implementations use a feeder robot to make the use of the third party process transparent to the user, meaning the user does not see a user interface for the third party, and therefore has a better user experience. The feeder robot may also collect information from various sources to reduce the amount of input provided by the user to complete the process. In some implementations at least some of the information used to authenticate the user must be provided via a user interface provided by the controlled access application.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Example embodiments are described with regard to health related entities as sources of health related data, however, the embodiments are not limited to the health industry and the inventive concepts can be applied to industries in which intelligent and highly secure communication among entities is needed. For example, the strong authentication techniques disclosed may be used in financial industries, educational institutions, etc., that deal with highly personal information. To solve the problem associated with meeting the high standards for authentication, allowing a user to minimize the number of identification factors the user creates and maintains, and providing a fluid and transparent user experience, the example implementations provide a system to transparently use the existing authentication process of an Identity Provider to meet the strong authentication requirements of a controlled access program without having to create and verify an ID factor specific to the controlled access program. Thus, disclosed implementations take advantage of authentication credentials a user already has to satisfy a specified level of assurance in verifying a user's identity before granting access to a controlled access application. The disclosed implementations provide this service in a transparent manner, meaning the user does not directly access the existing authentication process. Instead, a feeder robot assists the user by simulating the user's interaction with the existing authentication process via a user interface provided by the controlled access application. Thus, the controlled access program can use the feeder robot to take advantage of an existing authentication process that meets a specified security level to provide a seamless experience for the user.

Figure 1:
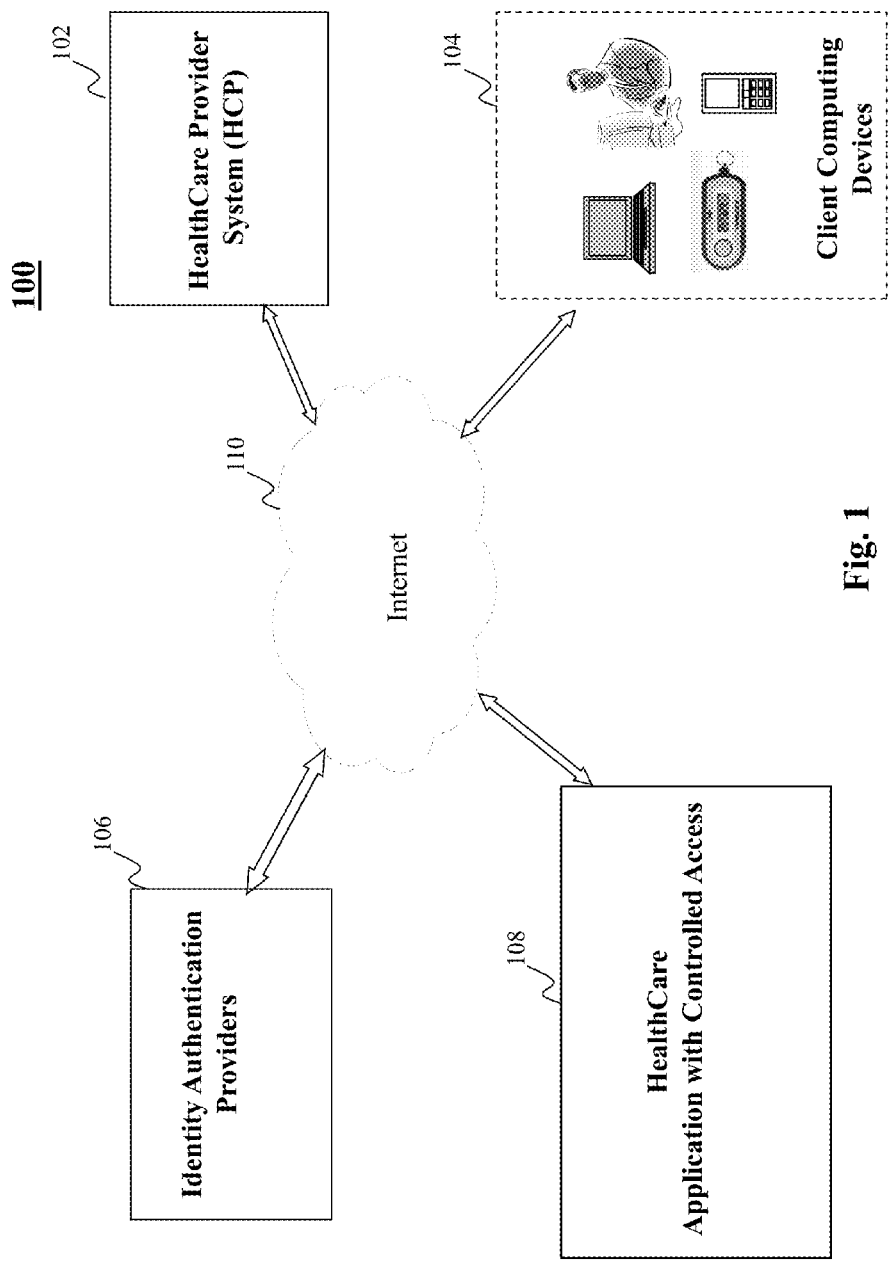
FIG. 1 describes a high level depiction of a system configuration, according to a disclosed embodiment.

As shown in FIG. 1, a networked environment 100 may include a number of computing devices that are in data communication with each other through the Internet 110. The computing devices may include web application servers, such as Healthcare Provider System (HCP) 102, one or more Identity Authentication Provider Host Verification Systems 106, and a HealthCare Application with Controlled Access 108. The computing devices may also include client devices 104 which provide a web user interface, such as, for example, a browser, for a human user to access various web applications on the web, including the HealthCare Provider System 102, the Identity Authentication Provider Host Verification System 106, and the HealthCare Applications with Controlled Access 108.

The Healthcare Provider System (HCP) 102 may include a web-based healthcare enterprise system for a healthcare organization, such as, for example, a hospital, a clinic, or an electronic medical records systems (EMR) for a healthcare providers' office. Accordingly, the HCP 102 may include a computing device, such as a computer, a server or a number of communicatively connected distributed servers, that has one or more processors (e.g., a processor formed in a substrate) configured to execute instructions stored in memory, such as main memory, RAM, or disk. The instructions may be stored in modules or engines and may provide functionality typical of an enterprise system, including an EMR.

Identity Authentication Provider Host Verification Systems 106 include computing systems running web applications that may include identity management and authentication service to other web applications. The identity authentication process for Identity Authentication Provider Host Verification System 106 may be a third-party system. In other words, the Identity Authentication Provider Host Verification System 106 may lack a relationship with the enterprise system (e.g., the HCP 102) that provides the access to the application with controlled access 108. The authentication process for the Identity Authentication Provider Host Verification System 106 may comply with a particular level of assurance (LOA). The National Institute of Standards and Technology (NIST) provides a standard for meeting various assurance levels and the authentication provided by a particular Identity Authentication Provider Host Verification System 106 may comply with one or more levels.

For example, NIST Special Publication 800-53 covers security and privacy controls for Federal information systems and organizations. Many healthcare providers must adhere to these controls, so an Identity Authentication Provider 106 that provides service for the healthcare provider system 102 must incorporate the applicable control. NIST 800-53 sets different standards for the various LOAs. For example, LOA1 may be a lowest level that does not require any proof of identity prior to providing a user id/password. LOA2 may require supporting documentation, such as a birth certificate, passport, driver's license, etc. prior to issuance of a user id/password. Thus, higher levels of assurance require multiple types of identification verification to meet the LOA standard. Systems in compliance with the appropriate NIST standards may be used to verify identity prior to, for example, releasing records, issuing credit, providing a login, or performing another similar event.

Thus, for example, the Identity Authentication Provider Host Verification System 106 may be an enterprise system, wherein its users (e.g. employees or customers) may login with their login credentials (typically a username and a password), after satisfying LOA2. In another example, the Identity Authentication Provider Host Verification System 106 has an overall assurance level of LOA3. In this example, the users of the Identity Authentication Provider 106 have passed an identity proofing process at meets the LOA3 requirement as per NIST 800-53 and, thus, the ID factor (e.g., user id/password) for the Identity Authentication Provider Host Verification System 106 meets the LOA3 requirements. In conjunction, the Identity Authentication Provider Host Verification System 106 may also apply an authentication method that meets the requirement of LOA3 as per NIST 800-53. For example, the Identity Authentication Provider 106 may use authentication method that provides two-factor identification, e.g., verifies at least two credentials that are associated with a particular user. A credential can be a password or PIN number, an answer to a security question, a secret code, a biometric factor (e.g., face scan, voice sample, thumbprint scan, iris scan, vein pattern, genome, etc.), a preselected gesture, account information, a pre-selected image, a token, etc., used to identify a particular user or anything that the user has established for such a purpose. In addition, the credential may also be a security device the user carries, such as, for example, a hard token, a mobile phone, a smart card, or any other security device that the user may carry. Such devices may display a number that changes and synchronizes with the system that issued the security device. Examples of commercially available security devices, e.g., hard token credentials, may include Symantec Security tokens, Verizon tokens, Vasco tokens, RSA tokens etc. Commercially available biometric credentials verification services includes, for example, XFA, which validates a user's voice, and Bio-key, which validates the user's finger prints etc. Thus, for example, the Identity Authentication Provider Host Verification System 106 may be an enterprise system, wherein its users (e.g. employees or customers) may login with their login credentials (typically a username and a password), after satisfying LOA2. In another example, the Identity Authentication Provider Host Verification System 106 has an overall assurance level of LOA3. In this example, the users of the Identity Authentication Provider 106 have passed an identity proofing process at meets the LOA3 requirement as per NIST 800-53 and, thus, the ID factor (e.g., user id/password) for the Identity Authentication Provider Host Verification System 106 meets the LOA3 requirements. In conjunction, the Identity Authentication Provider Host Verification System 106 may also apply an authentication method that meets the requirement of LOA3 as per NIST 800-53. For example, the Identity Authentication Provider 106 may use authentication method that provides two-factor identification, e.g., verifies at least two credentials that are associated with a particular user. A credential can be a password or PIN number, an answer to a security question, a secret code, a biometric factor (e.g., face scan, voice sample, thumbprint scan, iris scan, vein pattern, genome, etc.), a preselected gesture, account information, a pre-selected image, a token, etc., used to identify a particular user or anything that the user has established for such a purpose. In addition, the credential may also be a security device the user carries, such as, for example, a hard token, a mobile phone, a smart card, or any other security device that were the specifically user may carry. Such devices may display a number that changes and synchronizes with the system that issued the security device. Examples of commercially available security devices, e.g., hard token credentials, may include Symantec Security tokens, Verizon tokens, Vasco tokens, RSA tokens etc. Commercially available biometric credentials verification services include, for example, XFA, which validates a user's voice, and Bio-key, which validates the user's finger prints, etc.

Using the previous example of an Identity Authentication Provider Host Verification System 106 with LOA3, in addition to verifying the user's login credentials via password, the Identity Authentication Provider Host Verification System 106 may also verify an additional credential, such as, for example, a Verizon token or Vasco token, that was issued to the particular employee. In other examples of a multi-factor authentication, the Identity Authentication Provider Host Verification System 106 may verify any one or more of the credentials, or ID factors, that are known to be associated with the user.

A HealthCare Application with Controlled Access 108 can include web applications that require strong authentication or a higher LOA than what is normally required for the HCP 102 system. For example, the HealthCare Application with Controlled Access 108 may include an application for authorized physicians or hospital staff to electronically prescribe controlled substances. Such a task may require a higher LOA than most of the other tasks performed by the HCP 102 system. Thus, that particular task may be performed by or in conjunction with HealthCare Application with Controlled Access 108.

Figure 2:
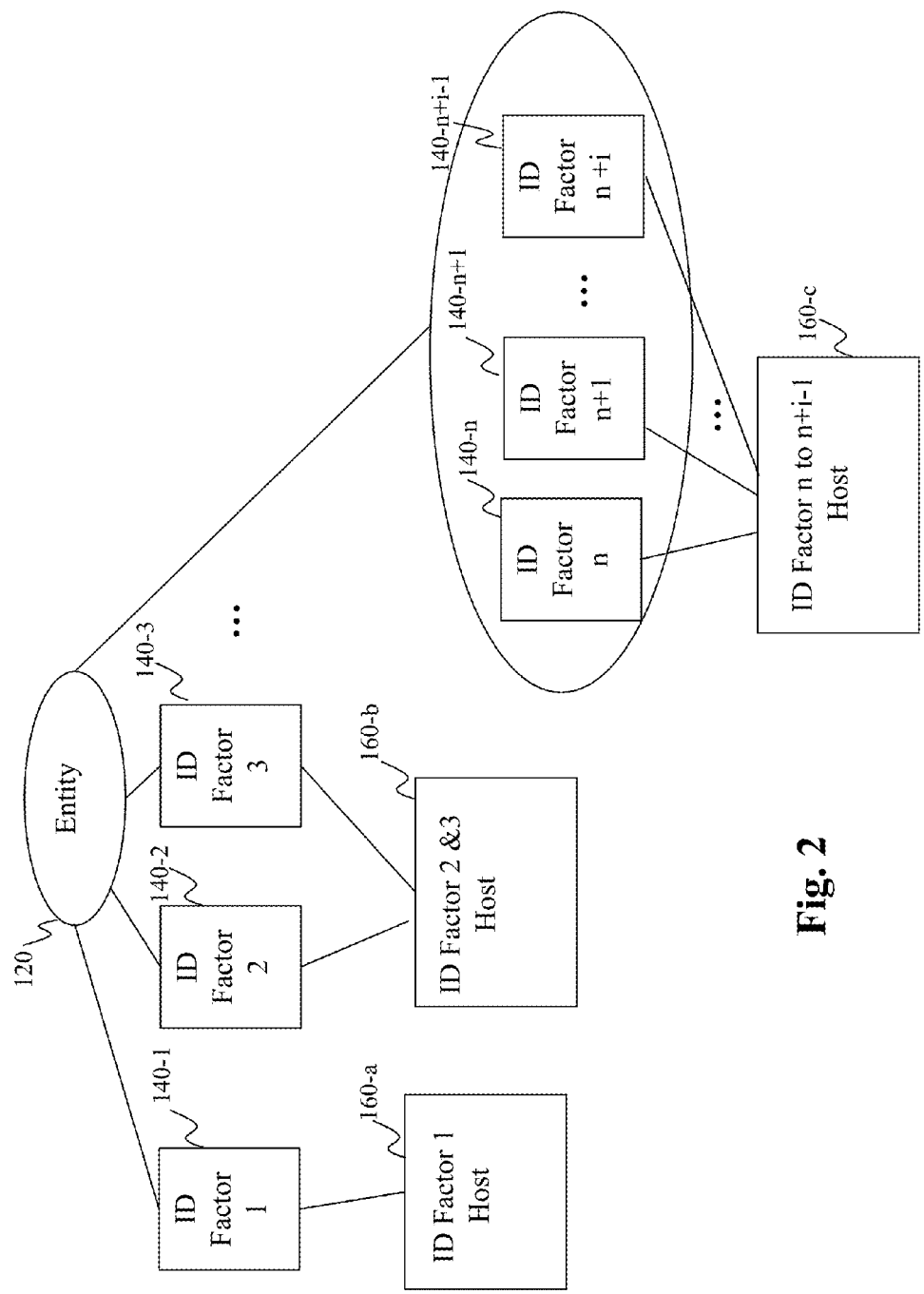
FIG. 2 is a high level depiction of an exemplary entity and a number of identity factors, according to a disclosed embodiment.

FIG. 2 is a high level depiction of an exemplary entity and a number of identity factors, according to disclosed embodiments. An entity 120 typically includes a human user that interacts with a number of web sites on the Internet. The entity 120 may access a website anonymously, or the entity 120 may also access a web site, such as, for example, website-a, as a registered user. As a registered user of website-a, the entity 120 may establish one or more ID factors 140 with the website-a. Having registered with a number of websites, the entity 120 may have established, in a distributed manner, a good number of ID factors, each ID factor being associated with a particular website.

An ID factor 140 typically includes a user identifier for the registered user paired with an authentication credential for use at a particular website, or host authentication server. In one example, an ID factor, such as, for example, ID factor 140-1 in FIG. 2, may include a user identifier (e.g., a user name) and a password credential that is paired with the user identifier. In another example, an ID factor 140-2 may include a pairing of a user identifier and a particular biometric credential of the entity 120.

In still another example, an ID factor, such as, for example, ID factor 140-n in FIG. 2, may include a pairing of a user identifier and a credential that is in the form of a security device issued to the user. The security device includes, for example, a physical device that may dynamically generate a one time password. The security device may also include a mobile phone that runs one or more security applications. The security device may also include a smart card, or any other security device that are specifically associated with the user, or entity 120.

An established ID factor 140 typically is hosted and verified by an associated ID factor host 160, which runs on a corresponding host verification server. In one embodiment, website-a may serve as the ID factor host for the one or more ID factors 140 for website-a. In another embodiment, website-a may redirect the verification of the ID factors 140 of its registered users to a specific authentication server.

In one example, website-a implements a simple one-factor authentication method. The entity 120 establishes an ID factor 140-1, which may be verified by ID factor host 160-a. In another example, website-a implements a two-factor authentication method. The entity 120 may have established two ID factors for a single registered user of website-a, such as ID factor 140-2 and ID factor 140-3. These two ID factors may, for example, share the same user identifier as related to a same registered user entity 120. These two ID factors may, for example, be verified by the same ID factor host 160-b.

In still another example, website-a implements a multi-factor authentication method. As shown in FIG. 2, the website-a requires a number i of ID factors: ID factor 140-n, ID factor 140-n+1 . . . ID factor 140-n+i-1. These i ID factors may, for example, all be verified by the same ID factor host 160-c. In some embodiments, these ID factors may, for example, share the same user identifier as related to a same entity 120.

In one particular example, the entity 120 registered successfully with website-a with an identifier, such as, for example, user-identifier-a for his/her access to the website-a. Moreover, the entity 120 may be associated with one or more credentials for authenticating himself/herself and accessing the website-a as the user-identifier-a. For example, the entity 120 may establish a password-a for the user-identifier-a for authenticating with website-a.

With respect to the website-a, the entity 120 is linked to the user-identifier-a and the one or more credentials that are provided to the entity 120. Verifying the one or more credentials that are linked to the user-identifier-a allows the website-a to ascertain that an online user, using the user-identifier-a to access the website-a, is, in fact, the entity 120.

The website-a typically provides one or more web user interfaces for user authentication. More specifically, the one or more web user interfaces allows an online user to supply the user-identifier and one or more credentials, and may allow the online user to interactively respond to an authentication workflow as specific to the web-site a.

In one example, as shown in FIG. 2, ID factor host 160-a may serve as an ID factor host for an ID factor 1 (the paring of the user-identifier-a and the password for user-identifier-a) of the entity 120. In one embodiment, the website-a serves as the ID factor host 160-a, as the website-a hosts and verifies the ID factor 1 as associated with the entity 120. In another embodiment, the website-a may redirect the verification of the ID factor 1 to another website, web service, or server. Thus, ID factor host may be the website-a or another computer, server, web service, etc., contracted to work with website-a.

In a distributed manner, the entity 120 may have established a large number of ID factors, each ID factor being verifiable by its respective ID factor host. An authentication process that requires verifying a combination of two ID factors is stronger authentication than an authentication process that requires verifying only one of the two ID factors. Further, an authentication process that verifies a combination of two ID factors that are associated with two different websites or two different ID factor hosts also provide strong authentication.

Figure 3:
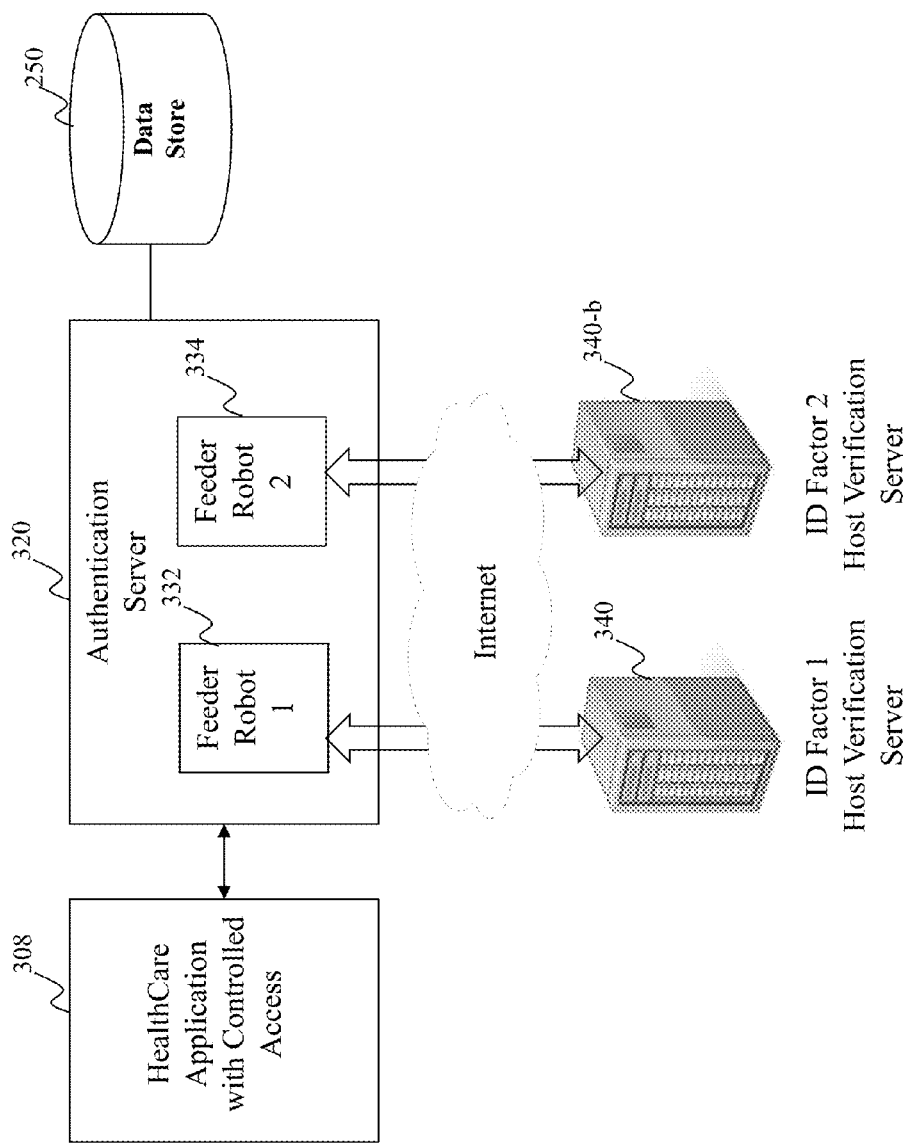
FIG. 3 shows an exemplary system diagram that includes authentication feeder robots, according to a disclosed embodiment.

FIG. 3 shows an exemplary system diagram that includes feeder robots, according to an embodiment of the present teaching. In FIG. 3, Healthcare Application with Controlled Access 308 describes a service that provides web services to a service client, such as, for example, the web based HealthCare Provider (HCP) system. The Healthcare Application with Controlled Access 308 requires a strong authentication before granting access to an online user of the HCP system. HealthCare Application with Controlled Access 308 may be an example of HealthCare Application with Controlled Access 108 of FIG. 1.

The HealthCare Application with Controlled Access 308 may run on the authentication server 320 or may be run on a server in communication the authentication server 320. Authentication server 320 provides strong authentication for the HealthCare Application with Controlled Access Server 308. The authentication server 320 may manage one or more feeder robots, such as, for example, feeder robot 332 and feeder robot 334 in FIG. 3. A feeder robot is a software program or software agent that acts on behalf of a human user to perform automated tasks over the Internet. In one embodiment, a feeder robot is specifically configured to facilitate the verification of an ID factor on behalf of an online user. The feeder robot may be implemented with a variety of scripting languages, such as, for example, domain-specific language (DSL), Groovy, Scala, Play and Google, and server-side JavaScript.

The feeder robot may be configured to receive one or more credentials for a user and use the credentials to complete an existing identity verification process with a host verification server. Accordingly, for example, the feeder robot may collect information related to the online user required for verification purposes. In one embodiment, the feeder robot may access a data store 250 to find information with respect to the online user. Data store 250 may be a database or other data store accessible to or stored on authentication server 320. The data store 250 may store partial authentication information for a user in a user profile. For example, the data store 250 may store reference to one or more ID factors or host verification servers that the user has an established relationship with. For example, the data store 250 may store a user name for host verification server 340-a and may store a user identifier for host verification server 340-b. If the ID factor 1 is a user name/password combination, the data store 250 does not store the password for the user name and if the ID factor 2 is a user identifier/biometric pattern, the data store 250 does not store the biometric pattern. Thus, the data store 250 may serve as a repository of the existing ID factors for a user and partial information for the ID factor, even if the entire ID factor is not stored.

Of course, implementations are not limited to use of the data store 250 alone, but may also access other web services to obtain similar information related to the online user. For example, the feeder robot may obtain some information directly from the user. For instance, the feeder robot may obtain the password or biometric pattern from the user to complete the ID factor 1 and ID factor 2 discussed above. As another example, the feeder robot may request both a user name and password from the user. In another example, the feeder robot may also browse the Internet, or request information from one or more information providers via web services. For example, a public web-based directory may include registration numbers for professionals, which can be found using a name lookup. The registration number (e.g., a National Provider Identifier (NPI) number for a doctor) may be public information that can be used as part of an ID factor. Alternatively, the feeder robot may be configured to look up a name for a user based on a particular identifier (e.g., such as the NPI) using publicly-available websites.

A feeder robot may be configured for a particular host verification server. A host verification server is an example of Identity Authentication Provider Servers 106 of FIG. 1. For example, feeder robot 1 may be configured to work with ID factor 1 host verification server 340-a and feeder robot 2 may be configured to work with ID factor 2 host verification server 340-b. Each feeder robot may be configured to simulate a human interaction with an authentication verification process associated with its particular host verification server. Accordingly, each feeder robot may be configured to interact with a particular set of verification web pages or programs.

For example, the feeder robot may establish an interactive session with the ID factor host web site (e.g., running on the host verification server or in communication with the host verification server) to verify an ID factor for an online user. In some embodiments, the feeder robot may be configured to request and receive an entire web page from a web site, such as the website used with ID factor 1 host verification server 340-a, using the Hyper Text Transfer Protocol (HTTP) or related protocols. In one embodiment, the feeder robot may send a HTTP or HTTPS (e.g., a secure form of HTTP) request to the ID factor host web site. Of course implementations may use other communication protocols.

Upon receiving a resulting HTTP or HTTPS response, such as, for example, in the form of information used to display a web page from the web site, the feeder robot may automatically "fill in" user inputs in a web form of the web page, simulating the online user action, and submit the resulting web form back to the website in a new HTTP or HTTPS request. For example, the feeder robot may extract desired information from the website, for example using text grepping, scraping, or other data extraction, and regular expression matching, as well as using programming languages, such as, for example, Perl or Python. The feeder robot may be configured to recognize the data structure of the web page, for example identifying particular data items or form fields as relevant to the authentication process. For example, the feeder robot may be configured to identify a session identifier, status information, and other similar information from the HTTPS response used to maintain a particular connection with the host verification server.

In some implementations, the feeder robot may include rules as to what information to extract from the website. The rules may specify where to look for the website (e.g., a path name or URL), how particular information, such as the session identifier or status information, is identified in the website, what fields to populate with information obtained from the data store, the user, or other methods, how the data fields are mapped (e.g., what field corresponds to the user identifier, which control corresponds to a submit button), etc. In some embodiments, the rules are configurable. For example the authentication server 320 may include a user interface that enables a user to modify the rules so that a feeder robot can adapt to a change in the web page or host verification server. Thus the rules may specify how to identify information to extract and how to identify elements to populate (e.g., the password field). In some implementations, some of the rules may map name-value pairs in the website to field names in the data store and/or input to be obtained from the user.

The feeder robot may also be configured to provide the information extracted from the website to a recording interface, such as, for example, a web form. In some implementations, the feeder robot may use a web scraping method to transform extracted information into the recording interface. The recording interface may be a web-form (e.g., a user login-form) that a human user would fill out. For example, if the feeder robot extracts information, such as a NPI, from a search of a public website, the feeder robot may be configured to insert the NPI into a login-form. Thus, the feeder robot may automatically "fill in" one or more user inputs fields of a web form with information it extracted previously.

In addition, the feeder robot may augment the extracted information with collected information. Collected information may be collected from various sources. For example, the feeder robot may collect information from the data store 250. The feeder robot may also get collected information from browsing the Internet, or requesting information from one or more information providers via web services. As another example, the feeder robot may collect additional information from the user. For example, the feeder robot may be configured to request that the user provide a password or biometric information or even a user identifier (e.g., user name). In some implementations, at least some of the collected information must be collected from the user in order to complete the authentication request. The feeder robot may also be configured to fill in a password field in the recording interface with information received from the user. Further, as part of gathering information, the feeder robot may interact with a web target or other network services intended for people. For example, the feeder robot may make communication requests to a web target, such as a web site, a web service provider server, or even one of the "Internet of things." The feeder robot may receive responses from the web target and extract desired information from received responses.

Thus, the feeder robot may be configured to emulate the human user filling in the web form. The above process may continue until a certain condition is met. For example, the ID factor web site has returned a definitive verification result of the ID factor or an error indicating failure to authenticate.

In other embodiments, the feeder robot may communicate with the ID factor host verification server, including its web servers, or exposed web services of a web service provider, by means of API calls, webpage posts, or Universal Resource Locators (URLs) redirects etc. In some implementations, the feeder robot may be configured to handle a workflow or status request issued as part of the authentication. For example, the host authentication server may redirect the robot to a website that requests additional information, such as the user's address or National Provider Identifier (NPI). The feeder robot may be configured to obtain the information, either from the data store or by searching for the information via public websites or directories, without having to ask the user for the information. The feeder robot may be configured to supply this information to complete the process. As explained above, in some implementations, rather than simulating a webpage submission, the feeder robot may use the collected information to generate an API request that is sent to the host verification server to authenticate the user.

In some implementations, the feeder robot may have a trusted relationship with the host verification server. In other words, the host verification server may recognize the feeder robot as belonging to authentication server 320 and used to assist in strong authentication, rather than a common web-crawling robot. A trusted relationship may be helpful when the authentication process of the host verification server includes a method of weeding out common robots, such as a CAPTCHA or similar measure. In some implementations, the host verification server may provide a challenge to the robot, similar to the security device mentioned above. For example, the feeder robot may have a token or a number generator provided by the host verification server. The number generator may be similar to the security device issued to a user, described above, and may be synchronized with the host verification server. When the feeder robot sends a response to the authentication interface of its corresponding host verification server, the feeder robot may include the token or a number generated by the number generator to prove that the feeder robot is trusted, e.g., not a common web-crawling robot. In some implementations, this token or number may be provided with the request for the authentication interface (e.g., via a HTTPS request), rather than with the completed (e.g., submitted) interface. Thus, the feeder robot may be configured to automate interaction with the ID factor host verification server and its corresponding website by submitting the ID factor credentials on behalf of the user and any other information the corresponding host verification server needs to trust the feeder robot, if applicable.

After the feeder robot submits a completed form (or the API call) to the host verification server, the ID factor host verification server verifies the submitted ID factor using its normal authentication process. In other words, the ID factor host verification server may not be aware that the form was submitted by the feeder robot.

In one embodiment, the authentication server 320 may initiate verification of additional ID factors for the same request before determining whether to grant access to the controlled access application. The additional ID factors may be for the same host verification server, or may be for a different server and, thus, include initiating another feeder robot. The authentication server 320 may select a feeder robot based on the ID factor to be verified, which may be supplied by the application with controlled access.

Figure 4:
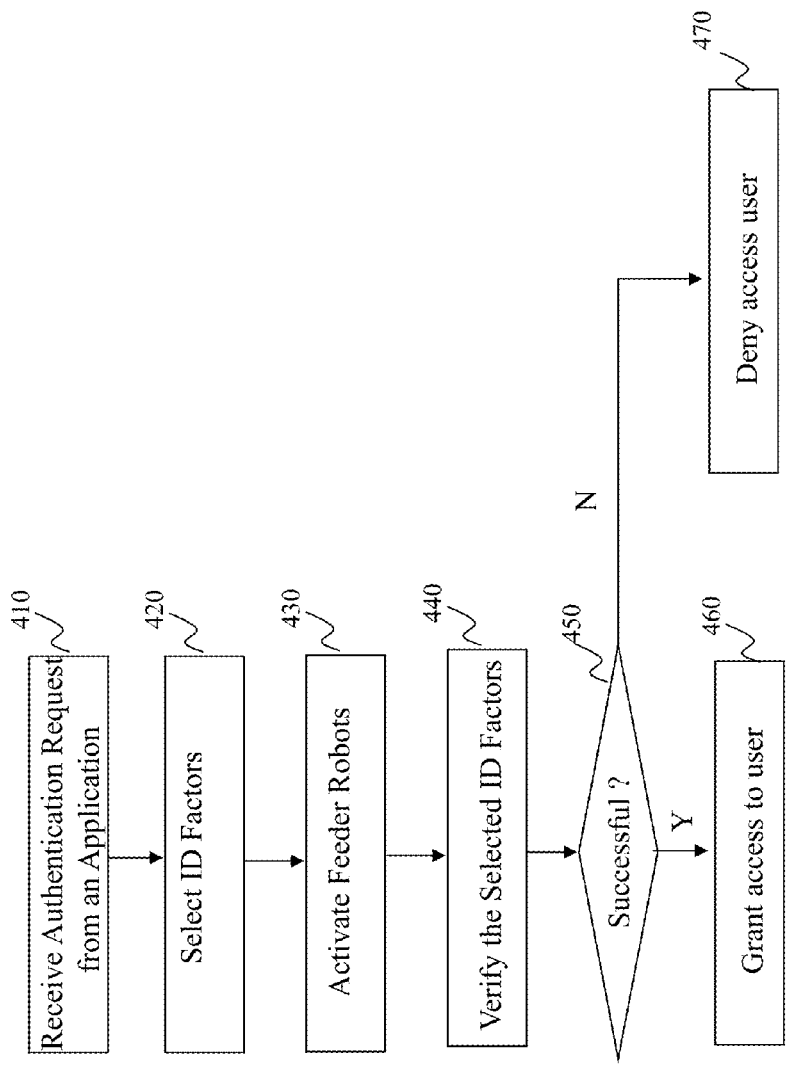
FIG. 4 illustrates a flowchart of an example process of strong authentication using feeder robots, according to a disclosed embodiment.

FIG. 4 illustrates a flowchart of an example process 400 of strong authentication using feeder robots, according to a disclosed embodiment. Process 400 may be executed by, for example, an authentication server, such as authentication server 320 of FIG. 3. Process 400 may enable a user to use existing credentials that will satisfy a specified LOA in accessing functionality provided by a controlled access web application, such as HealthCare Application with Controlled Access 308 of FIG. 3. Thus process 400 enables the user to meet a specified security requirement before enabling the functionality of a controlled access web application without having to go through the process of creating a new credential to meet the security requirement.

Process 400 may begin when the authentication server receives an authentication request from a controlled access application (410). The application may be a web application that requires a specified level of security, such as a specific LOA. In some implementations, the controlled access web application may be running on the authentication server and may receive the request from another application, such as an application running on the HealthCare Provider System 102 of FIG. 1. In some implementations, the controlled access web application may be running on the HealthCare Provider System 102. The request may identify a user associated with the request. For example, a particular user may be attempting to access the controlled access web application and the request may include an identifier for the particular user. The authentication server may select existing ID factors that meet the specified LOA for the user (420). In some implementations, the request from the controlled access application may specify the ID factors to be used. In some implementations, the authentication server may determine that the request needs two-step verification or three-step verification. In some implementations, the server may determine that the level of access requested requires biometric confirmation. The authentication server may use information in a data store, such as data store 250 of FIG. 3, to select an appropriate ID factor for the request. For example, the data store 250 may include rules that identify which types of credentials satisfy a LOA and the request may only specify a LOA. The authentication server may select from existing credentials for the user associated with the request. For example, user credentials may be stored in the data store and the authentication server may select an appropriate credential from the data store. In some implementations, the requesting program may specify which credentials to use, so the server simply selects the ID factor for the specified credentials.

The authentication server may select and activate one or more feeder robots (430) to verify the selected ID factors. The feeder robot(s) selected corresponds to the ID factor selected. For example, each ID factor may be associated with a particular Identity Provider and corresponding authentication webpage or API at a host verification server, and each feeder robot may be configured to complete the authentication process with the corresponding host verification server. Thus, the feeder robot selected may depend on the ID factor selected. If more than one ID factor is selected (e.g., the request has a two-step verification process), the authentication server may activate the feeder robots in series, meaning that after the first feeder robot successfully verifies the first ID factor, the authentication server activates a second feeder robot to verify the second ID factor. Of course the second feeder robot can be the same robot as the first feeder robot, depending on the second ID factor. If the feeder robot(s) are able to verify all selected ID factors (450, Y), the authentication server grants access to the user to the controlled access web application (460). If the feeder robots fail to verify any one of the selected ID factors (450, N), the authentication server denies access to the controlled access web application (470).

Figure 5:
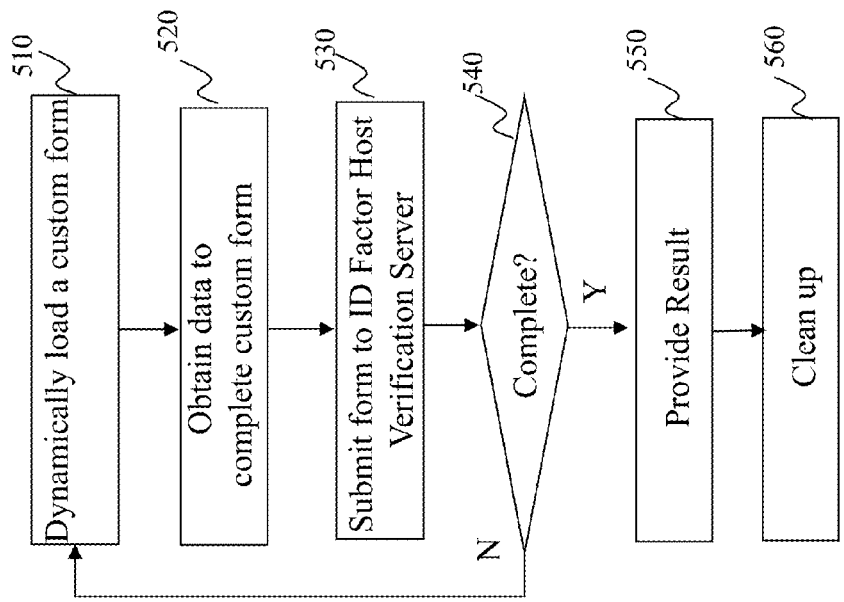
FIG. 5 illustrates a flowchart of an example process for verifying a selected identity factor, according to a disclosed embodiment.

FIG. 5 illustrates a flowchart of an example process 500 for verifying a selected identity factor, according to a disclosed embodiment. Process 500 may be executed by a feeder robot running on an authentication server, such as Feeder Robot 1 332 running on authentication server 320 of FIG. 3. The feeder robot may dynamically download a custom form from an ID factor host verification server (510). At step 520, the feeder robot obtains data to complete the custom form. For example, the feeder robot may fetch data from a data store, such as data store 250 of FIG. 3, that corresponds to the ID factor and the user associated with the access request. As another example, the feeder robot may obtain data directly from the user. For example, the feeder robot, using its own user interface or working with the requesting application, may request that the user provide credential information to complete the ID factor. For example, the feeder robot may obtain a password from the user, biometric scan information, a token, a code from a security device, etc. In some implementations, the feeder robot may obtain part of the data from a data store and part from the user. For example, a user name or other identifier may be stored in the data store and the feeder robot may obtain the user name from the data store and then obtain a password for the user name from the user.

Once the feeder robot obtains data, the feeder robot may use the data to complete the custom form. For example, the feeder robot may be configured to simulate a user entering a username and password into the custom form. In some implementations, this may include setting values for variables and triggering execution of script on the form. In some implementations, this may include setting up variable/value pairs in a URI or URL. In some implementations, this may include using the data to initialize an API call. The feeder robot may then submit the completed form to the ID factor host verification server (530). This may include using an HTTPS request to submit the completed form to the host verification server, which simulates a user selecting a "login," "go," or other similar control. In some implementations, this may include sending the API request to the host verification server. In some implementations, this may include submitting the completed URI/URL. In some implementations, completing the form may include generating Security Assertion Markup Language (SAML) or using openId® Connect to do credential exchange or LDAP lookup and matching. Submitting the form to the ID factor host verification server simulates an authentication request submitted by a user, and is thus considered an authentication request or in other words a request to verify credentials.

At step 540, the feeder robot determines whether the interaction with the ID factor host verification server is complete. The interaction may be complete (540, Y) when the host verification server indicates the authentication failed. If the authentication failed, no further verifications need to be processed by this feeder robot. If the authentication request is successful, the interaction may not be complete when the feeder robot needs to authenticate another selected ID factor with the host verification server. For example, if the first ID factor is a user ID/password the host verification server may follow-up with a token request. Thus, a second ID factor may be the token. Because the feeder robot has another ID factor to verify with the host authentication server, the feeder robot will continue to handle the second ID factor and the interaction is not complete (540, N). Accordingly, the feeder robot will repeat steps 510 to 530, but using the custom form for the second ID factor. Where any additional selected ID factors are handled by the same host verification server, the feeder robot may continue repeating steps 510 to 540 until the interaction is complete.

When the interaction is complete (540, Y), the feeder robot provides a verification result, for example to the authentication server 320 and/or to the requesting application with controlled access 308. The result may be a successful grant of access or a denial of access, as explained above with regard to process 400 of FIG. 4. At step 560, the feeder robot does clean up, for example closing the connection with the host verification server. This enables the host verification server to close the session and release any resources dedicated to the secure session. The cleanup enables the feeder robot to act as a state machine, restoring its original state and avoiding possible hijacking(s) and man-in-the-middle attacks.

Figure 6:
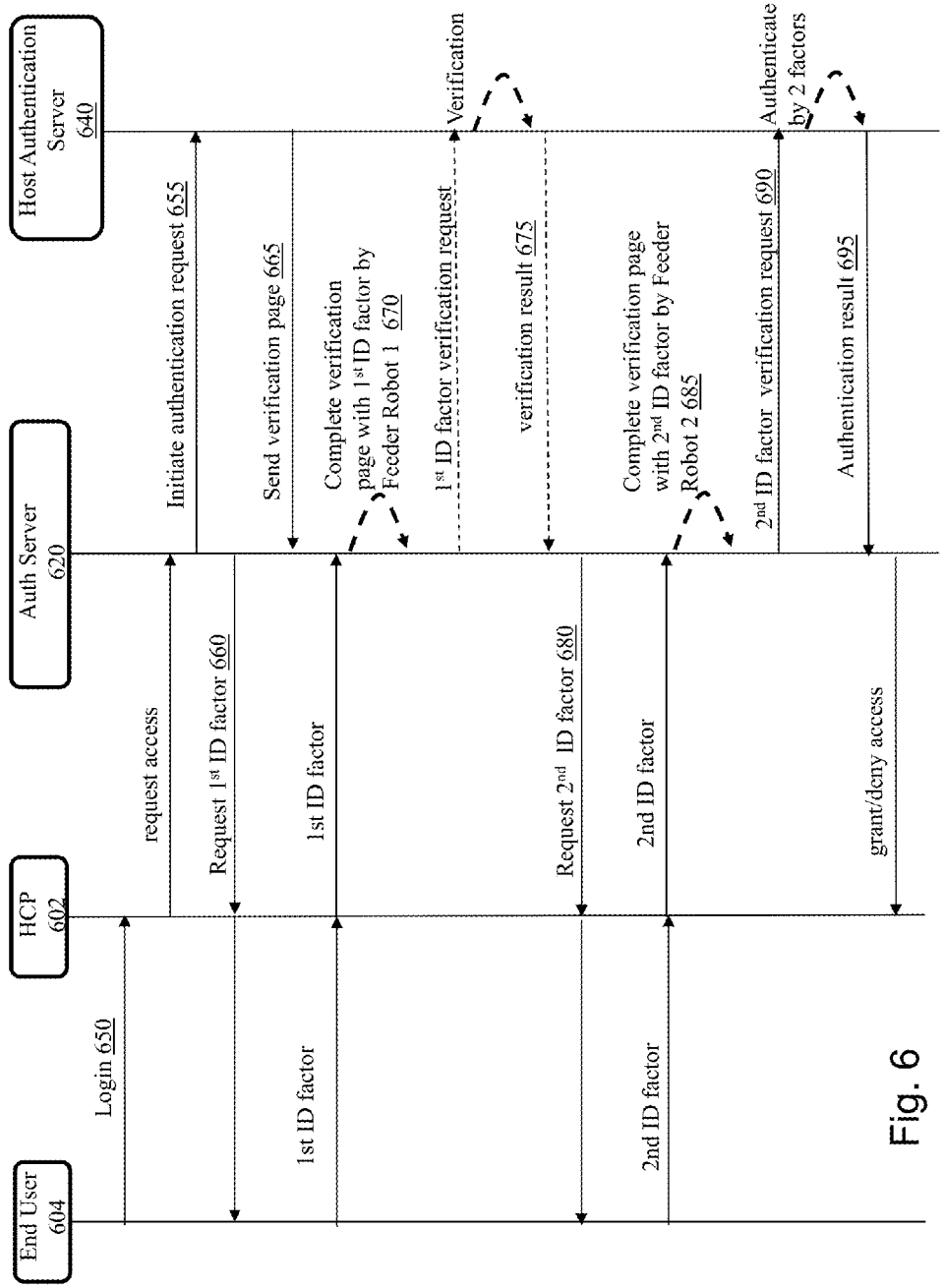
FIG. 6 is a messaging diagram illustrating various example interactions between some of the components in the networked environment as shown in FIG. 1, according to a disclosed embodiment.
Figure 7:
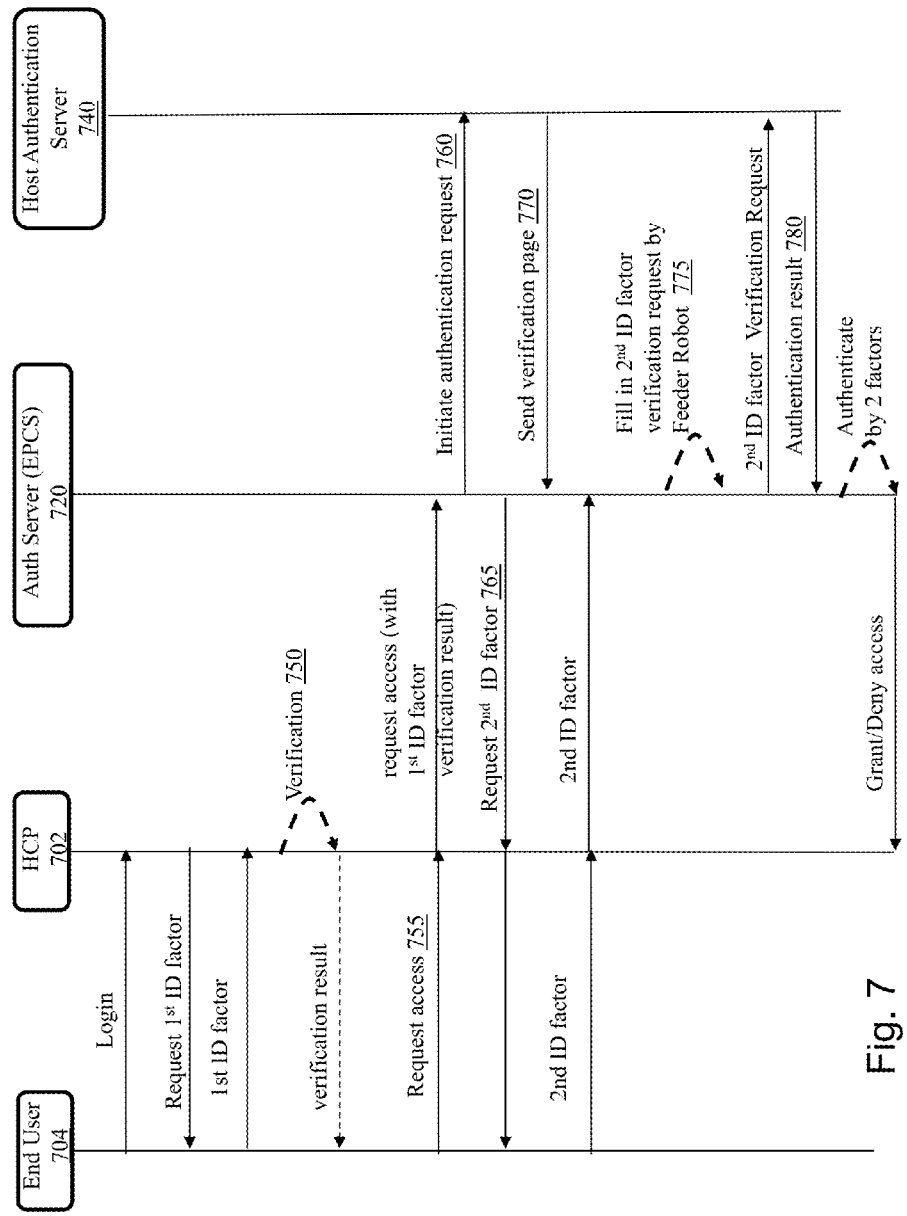
FIG. 7 is another messaging diagram illustrating various example interactions between some of the components in the networked environment as shown in FIG. 1, according to a disclosed embodiment.

FIGS. 6 and 7 are messaging diagrams illustrating various example interactions between some of the components in the networked environment as shown in FIG. 1, according to a disclosed embodiment. For ease of explanation, the interactions of FIGS. 6 and 7 refer to an entity 120 as a doctor who interacts with Hospital A, which is a hospital organization running the healthcare provider system (HCP System). The doctor may be represented as end user 604 or end user 704. The HCP system is also accessible as a website, for example http://providers.hospitalA.com. The HCP system may be represented as HCP 602 or HCP 702. However, implementations are not limited to the entities described as similar implementations may be employed by other industries, such as universities, research centers, criminal justice, financial institutions, etc.

In the example of FIG. 6, the doctor may have a relationship with Hospital A, for example may have a contract to use some of the functionality offered by the HCP system 602. For example, the doctor may use the HCP 602 to access an application with controlled access. The application with controlled access may be an EPCS application that enables an authorized person, such as a doctor, to prescribe controlled substances for patients. The doctor may use the EPCS application to order medications for patients to pick up at the Hospital. This type of application with controlled access may require, by law, regulation, or policy, a certain level of assurance. In the example of FIG. 6 the controlled access application requires authentication by two factors. The controlled access application may be running on the HCP 602 or may be running on the Authentication Server 620.

In order to access the controlled access application, the end user 604 may request a login (650) to the application via the HCP 602. Rather than setting up its own authentication process that satisfies the strong authentication, the HCP 602 may be configured to use the authentication server 620 and its feeder robots to use an existing strong authentication process from an identity provider that meets the level of assurance requirements for the program. The identity provider may use the host authentication server 640 to authenticate users using two ID factors. The authentication server 620 may or may not have a trusted relationship with the host authentication server 640.

As one example, the identity provider may be Verizon and the host authentication server 640 is a Verizon UIS system. In this example, the feeder robot is configured to verify a Vasco token or Verizon token, which typically may be verified by a user interacting with a specific web site from Verizon, i.e., from the Verizon UIS server. The Verizon UIS server may provide a two factor authentication mechanism. First, a user may access a Verizon web page that includes a user interface, such as a web form where the user may supply a first ID factor, e.g., a Verizon user name and password. Second, upon successful verification of the first ID factor, the user may be presented with a token challenge, i.e., a second ID factor. Successful authentication by the host authentication server 640 may thus require successful verification of two different ID factors. In some implementations, each ID factor has a corresponding feeder robot. In other words, although the same Host Authentication Server 640 is used, the first ID factor and the second ID factor may trigger different feeder robots. In some implementations a single feeder robot may be configured to handle both types of feeder robots.

The HCP 602, recognizing the login request 650 for the application with controlled access, may request access from the authentication server 620. The authentication server 620 may select a feeder robot configured to interact with the host authentication server 640 and may use the feeder robot to initiate an authentication request (655). The feeder robot may, for example, send a login request to the URL for the ID factor host, as well metadata associated with the URL. In some implementations, for example where the feeder robot uses an API, the initial authentication request (655) may be optional. Because the feeder robot is configured to work with this particular authentication process, e.g., for the host authentication server 640, the feeder robot knows which ID factor information is needed from the end user. Accordingly, the feeder robot will request (660) the first ID factor information from the user 604. The feeder robot may also obtain information about or for the first ID factor from a data store, or may perform a search for the information. The feeder robot may also receive a verification page (665) from the host authentication server 640. The verification page may represent information from a website a user would normally fill out. The feeder robot may extract any information needed from the received page.

The end user 604 may send back the requested ID factor information. For example, the requested ID factor information may be a user name and password. As another example, the feeder robot may look the user name up in a data store and just request the password from the end user 604. Thus, the feeder robot may obtain the information that comprises the first ID factor from various sources.

Once the feeder robot has obtained the information for the first ID factor, the feeder robot may use the information to complete the verification page (670). A web form, such as, for example a Hyper Text Markup Language (HTML) form on a web page allows a user to enter data that is sent to a server for processing. The feeder robot may, for example, use the information from the end user 604, the verification page, and the data store (if applicable) to provide values to fields or variables for the web form. Such values may be conventionally provided by the user 604 to the host authentication server 640. The feeder robot may provide the values to simulate the user filling the form out so that the authentication process is transparent to the user, e.g., does not require the user to leave the user interface associated with the HCP 602. The feeder robot may send the completed web form to the host authentication server 640 as a verification request for the first ID factor.

The host authentication server 640 may receive the request and use its existing procedures to verify the ID factor information provided. In some implementations, the host authentication server 640 may not know that the feeder robot submitted the request on behalf of the end user 604. In some implementations, the host authentication server 640 may have a trusted relationship with the feeder robot. The host authentication server 640 may send back a verification result (675) for the first ID factor. The verification result may indicate the success of the request. In the example of FIG. 6, the request is successful and the authentication server 620 requests information (680) for the second ID factor from the end user 604. The second ID factor may be specified by the HCP 602 along with the first ID factor. In some implementations (not shown in FIG. 6), the second ID factor may for a different identity provider.

The authentication server 620 may select a feeder robot to handle the second ID factor for the host authentication server 640. In some implementations (not shown), the feeder robot that handles the second ID factor for the host authentication server 640 may be the same feeder robot that handles the first ID factor. In the example of FIG. 6, the authentication server 620 selects a second feeder robot to handle the second ID factor. As discussed herein, in addition to obtaining information from the user for the second ID factor, the second feeder robot may obtain information from other sources, such as a data store or a search etc. After receiving the second ID factor, the feeder robot may complete a verification page from the host authentication server 640 using the information for the second ID factor (685). In the example of FIG. 6, the second ID factor information may include a token supplied by the end user 604. The feeder robot may use that information to fill out a web form or format an API call, which may then be submitted to the host authentication server 640 as a second verification request (690). The host authentication server 640 may verify the request and provide an authentication result (695). The authentication server 620 may provide the HCP 602 with the authentication result, either granting or denying access to the controlled access application, depending on the authentication result.

FIG. 7 is another messaging diagram illustrating various interactions between some of the components in the networked environment as shown in FIG. 1, according to a disclosed embodiment. In the example of FIG. 7, the entity 120 includes a doctor employed by Hospital A, which is a hospital organization running the healthcare provider system (HCP System). The doctor may be represented as end user 704. As an active employee of the Hospital A, the doctor is successfully registered with the HCP System of the Hospital A. The HCP system is also accessible as a website, for example, a hypothetical website http://providers.hospitalA-.com. The doctor initially establishes a first ID factor with the HCP system 702 that includes a username and password pair. The doctor may access applications and other functionality available via the HCP 702 by using the first ID factor.

The HCP system 702 may also include an application with controlled access, or in other words an application with strong security. The doctor may use the application with controlled access via the HCP system. The application with controlled access may be an EPCS application that enables an authorized person, such as a doctor, to prescribe controlled substances for patients. The EPCS application includes controlled access with a higher level of assurance than other applications available via the HCP system. The controlled access application may be running on the HCP 702 or may be running on the authentication server 720.

As illustrated in FIG. 7, the doctor may request a login to the HCP 702 using the first ID factor. After providing the first ID factor, the HCP 702 may determine whether the login is successful, e.g., at verification 750. The HCP 702 may send a verification result to the doctor 704. If the verification is successful, the doctor may be logged into HCP 702 and may use functionality provided by the HCP to an authorized user. Eventually, the doctor 704 may request access to the ECPS application, which is a controlled access program for prescribing medication, e.g., at 755. This request can also be part of the original login request, e.g., the doctor 704 requested a login to the HCP 702 specifically to access the EPCS program. Thus the request for access (755) may be implied as part of the login process or may occur subsequent to the login process. The HCP 702 may determine that access to the ECPS needs additional authentication. This requirement may stem from governmental regulations but could also stem from company policy, etc.

The HCP 702 may request access to the EPCS application via the authentication server 720. Because the doctor 704 has already provided a first ID factor as part of the login process, this ID factor and the verification result may be provided to the authentication server 720. The HCP 702 may also specify a second ID factor to be used to satisfy the authentication requirements (e.g., LOA) of the EPCS application. The authentication server 720 may use the second ID factor to determine which feeder robot to initiate and, therefore, which identity provider and host verification server to perform the authentication. The feeder robot may use an existing authentication process for the identity provider to minimize the number of ID factors the end user needs to have. The use of the existing authentication process may be transparent to the end user 704 by using the feeder robot. Thus, the end user 704 does not need to leave the user interface provided by the HCP 702 to complete the authentication process provided by the host authentication server 740.

After selecting the feeder robot appropriate for the second ID factor of the host authentication server 740, the feeder robot may initiate an authentication request (760) to the host authentication server 740. The feeder robot may, for example, send a login request to the URL for the ID factor host, as well metadata associated with the URL. In some implementations, for example where the feeder robot uses an API, an initial authentication request (760) may be optional. Because the feeder robot is configured to work with this particular authentication process, e.g., for the host authentication server 740, the feeder robot knows which ID factor information is needed from the end user. Accordingly, the feeder robot will request (765) the second ID factor information from the user 704. The feeder robot may also obtain information for the second ID factor from other sources, such as a data store or a search for the information. The feeder robot may also receive the verification page (770) from the host authentication server 740. The feeder robot may extract any information needed from the received page.

The end user 704 may send back the requested ID factor information. For example, the requested ID factor information may be a user name and password. As another example, the feeder robot may look the user name up in a data store and just request the password from the end user 704. Thus, the feeder robot may obtain the information that comprises the first ID factor from various sources. As another example, the requested ID factor information may be a token or biometric information.

Once the feeder robot has obtained the information for the second ID factor, the feeder robot may use the information to complete the verification page (775). A webform, such as, for example a HTML form on a web page allows a user to enter data that is sent to a server for processing. The feeder robot may send the completed webform to the host authentication server 740 as a verification request for the second ID factor.

The host authentication server 740 may receive the request and use existing procedures to verify the ID factor information provided. In some implementations, the host authentication server 740 may not know that the feeder robot submitted the request on behalf of the end user 704. In some implementations, the host authentication server 740 may have a trusted relationship with the feeder robot. The host authentication server 740 may send back a verification result (780) for the first ID factor. The verification result may indicate the success of the request and may grant or deny access to the controlled access program. FIG. 7 illustrates the use of two factor authentication where only one factor is verified by a third-party host authentication server.

In addition to the configurations described above, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments creates a new machine where in case of a computer a general purpose computer in effect becomes a special purpose computer once it is programmed or configured or caused to perform particular functions of the embodiments pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In one general aspect, an authentication server in communication with a controlled access application that requires at least a first Identifier (ID) factor and a second ID factor for authentication includes at least one processor and memory storing instructions that, when executed by the at least one processor, causes the authentication server to perform operations. The operations can include receiving a request to authenticate a user using the first ID factor and the second ID factor, obtaining first information to complete the first ID factor, at least some of the first information being obtained from a user attempting to access the controlled access application, and generating, at the authentication server, a first web form using the first information. The operations may also include submitting the first web form to a host verification server, receiving an indication of successful verification from the host verification server, obtaining second information to complete the second ID factor, at least some of the second information being obtained from the user, and generating, at the authentication server, a second web form using the second information obtained. The operations may further include submitting the second web form to the host verification server, receiving an indication of successful verification from the host verification server, and initiating, in response to receiving the indication of successful verification, access to the controlled access application.

These and other aspects may include one or more of the following features. For example, the first information can include information obtained from a data store for the user and/or the second information can include a security device token provided by the user. As another example, obtaining the first information, generating the first web form, and submitting the first web form may be performed by a first feeder robot configured to authenticate the first ID factor with the host verification server and obtaining the second information, generating the second web form, and submitting the second web form may be performed by a second feeder robot configured to authenticate the second ID factor with the host verification server. In some such implementations, the first feeder robot can include rules for extracting information from a verification form received from the host verification server and rules for placing the first information in the first web form.

As another example, generating the first web form can include requesting a verification form from the host verification server and extracting at least some of the first information from the verification form from the verification form after it is received. As another example, the first ID factor and the second ID factor may satisfy a mandated level of access requirement.

According to one general aspect, a method includes receiving a request to a controlled access application after a user has successfully logged into an enterprise system with a first Identifier (ID) factor, the controlled access application requiring additional authentication with a second ID factor, obtaining first information to complete the second ID factor, at least some of the first information being obtained from the user, and generating a first web form using the first information. The method also includes submitting the first web form to a host verification server, receiving an indication of successful verification from the host verification server; and initiating, in response to receiving the indication of successful verification, access to the controlled access application.

These and other aspects can include one or more of the following features. For example, the first information may include information obtained from a data store for the user and/or a security device token provided by the user. As another example, obtaining the first information, generating the first web form, and submitting the first web form may be performed by a first feeder robot configured to authenticate the second ID factor with the host verification server. In some such implementations, the first feeder robot is selected based on the second ID factor. As another example, generating the first web form can include requesting a verification form from the host verification server and extracting at least some of the first information from the verification form from the verification form after it is received. As another example, the first information obtained from the user may be obtained via a user interface provided by the controlled access application.

According to another general aspect, a method includes receiving a request to access a controlled access application, the request including a first Identifier (ID) factor and a second ID factor and identifying a user, selecting a first feeder robot configured to obtain first information for the first ID factor, activating the first feeder robot to generate a first web form using the first information, at least some of the first information being information obtained from the user, and submitting the first web form to a first host verification server. The method also includes receiving an indication of successful verification from the first host verification server, selecting a second feeder robot configured to obtain second information for the second ID factor, activating the second feeder robot to generate a second web form using the second information, at least some of the second information being information obtained from the user, submitting the second web form to a second host verification server, and initiating, in response to receiving an indication of successful verification from the second host verification server, access to the controlled access application.

These and other aspects can include one or more of the following features. For example, the first information may include information obtained from a data store for the user and/or the second information can include biometric information provided by the user. As another example, the first information obtained from the user and the second information obtained from the user may be obtained via a user interface provided by the controlled access application. As another example, generating the first web form can include requesting a verification form from the host verification server and extracting at least some of the first information from the verification form from the verification form after it is received. As another example, the first feeder robot and the first host verification server may have a trusted relationship and the first host verification server may lack a relationship with the controlled access application.

What is claimed is:

1. An authentication server in communication with a controlled access application of an enterprise system that requires at least a first Identifier (ID) factor and a second ID factor for authentication, the authentication server comprising:
    at least one hardware processor; and
    memory storing instructions that, when executed by the at least one hardware processor, causes the authentication server to perform operations including:
        receiving a request to authenticate a user to the controlled access application using the first ID factor and the second ID factor;
        selecting and activating, at the authentication server, a feeder robot configured to interact with a host verification server associated with the first ID factor and the second ID factor using HTTP protocol or HTTPS protocol;
        obtaining, via the feeder robot, first information to complete the first ID factor, at least some of the first information being obtained from the user, attempting to access the controlled access application through a user interface provided by the enterprise system;
        opening a connection between the host verification server and the authentication server;
        requesting, in an HTTP or HTTPS request made via the feeder robot, a first authentication user interface from the host verification server via the connection;
        receiving, in an HTTP or HTTPS response received via the feeder robot, the first authentication user interface in response to the request, wherein the first authentication user interface is not presented to the user;
        generating a token for the feeder robot,
        generating, via the feeder robot, a first web form using the first information and information used to maintain the connection that is extracted from the first authentication user interface;
        submitting, via the feeder robot, the token and the first web form to the host verification server, wherein submitting the first web form simulates a first submission by the user, wherein the token verifies to the host verification server that the feeder robot from the feeder robot is not a web-crawling robot;
        receiving, in an HTTP or HTTPS response received via the feeder robot, an indication of successful verification from the host verification server, the indication including a second authentication user interface, wherein the second authentication user interface is not presented to the user;
        obtaining, via the feeder robot, a second information to complete the second ID factor, at least some of the second information being obtained from the user;
        generating, via the feeder robot, a second web form using the second information and information used to maintain the connection that is extracted from the second authentication user interface;
        submitting the second web form to the host verification server, wherein submitting the second web form simulates a second submission by the user;
        receiving an indication of successful verification from the host verification server;
        cleaning up the feeder robot, including closing the connection with the host verification server; and
        initiating, in response to receiving the indication of successful verification, access to the controlled access application.

2. The authentication server according to claim 1, wherein the first information includes information obtained from a data store for the user.

3. The authentication server according to claim 1, wherein the second information includes a security device token provided by the user.

4. The authentication server according to claim 1, wherein obtaining the first information, generating the first web form, and submitting the first web form is performed by a first feeder robot configured to authenticate the first ID factor with the host verification server and obtaining the second information, generating the second web form, and submitting the second web form is performed by a second feeder robot configured to authenticate the second ID factor with the host verification server.

5. The authentication server according to claim 4, wherein the first feeder robot includes rules for extracting information from the first authentication user interface and rules for placing the first information in the first web form.

6. The authentication server according to claim 1, wherein generating the first web form includes:
    extracting at least some of the first information from the first authentication user interface after it is received.

7. A method comprising:
    receiving, at an authentication server associated with an enterprise system, a request to access a controlled access application after a user has successfully logged into the enterprise system with a first Identifier (ID) factor, the controlled access application requiring additional authentication with a second ID factor;
    selecting and activating, at the authentication server, a feeder robot configured to interact with a host verification server associated with the second ID factor using HTTP protocol or HTTPS protocol;
    obtaining, via the feeder robot, first information to complete the second ID factor, at least some of the first information being obtained from the user through a user interface provided by the enterprise system;

opening a connection between the host verification server associated with the second ID factor and the authentication server;

requesting, in an HTTP or HTTPS request made via the feeder robot, an authentication user interface from the host verification server via the connection;

receiving, in an HTTP or HTTPS response received via the feeder robot, the authentication user interface in response to the request, wherein the authentication user interface is not presented to the user;

generating a token for the feeder robot;

generating, via the feeder robot, a first web form using the first information and information used to maintain the connection that is extracted from the authentication user interface;

submitting, via the feeder robot, the first web form and the token to the host verification server, wherein submitting the first web form simulates a submission by the user, wherein the token verifies to the host verification server that the feeder robot from the feeder robot is not a web-crawling robot;

receiving an indication of successful verification from the host verification server;

cleaning up the feeder robot, including closing the connection with the host verification server; and initiating, in response to receiving the indication of successful verification, access to the controlled access application.

8. The method according to claim 7, wherein the information used to maintain the connection includes a session identifier.

9. The method according to claim 8, wherein the session identifier is extracted based on rules for the authentication user interface.

10. The method according to claim 7, wherein obtaining the first information, generating the first web form, and submitting the first web form is performed by a first feeder robot configured to authenticate the second ID factor with the host verification server.

11. The method according to claim 10, wherein the first feeder robot is selected based on the second ID factor.

12. The method according to claim 7, wherein generating the first web form includes:
extracting at least some of the first information from the authentication user interface after it is received.

13. The method of claim 7, further comprising:
receiving a request, at the authentication server, from a second controlled access application to authenticate a second user at a requested level of assurance;
identifying, in a data store, the second ID factor for the second user that meets the requested level of assurance;
selecting a second feeder robot configured to obtain second information for the second ID factor;
activating the second feeder robot to verify the second ID factor with the host verification server associated with the second ID factor by submitting, via HTTP protocol or HTTPS protocol, a second authentication user interface used by the host verification server, wherein the second authentication user interface is not presented to the second user and the second information is used by the second feeder robot in submission of the second authentication user interface; and
initiating, in response to receiving an indication of successful verification of the second ID factor, access to the second controlled access application.

14. The method of claim 13, wherein the second feeder robot verifies the second ID factor by:

opening a second connection with the host verification server;
requesting the second authentication user interface from the host verification server via the second connection;
receiving the second authentication user interface in response to the request;
generating a web form using the second information, at least some of the second information being information obtained from the second user and some of the second information being extracted from the second authentication user interface;
submitting the web form to the host verification server, wherein submitting the web form simulates submission by the second user;
receiving an indication of successful verification from the host verification server; and
closing the second connection.

15. The method of claim 13, wherein submission of the second authentication user interface includes using the second information and a second token to format an API call, wherein the second token verifies to the host verification server that the second feeder robot is not a web-crawling robot.

16. The method of claim 13, further comprising:
identifying, in the data store, a third ID factor for the second user that meets the requested level of assurance, wherein the requested level of assurance requires authentication by two factors;
selecting a third feeder robot configured to obtain third information for the third ID factor; and
activating the third feeder robot to verify the third ID factor with a host verification server associated with the third ID factor, wherein the third feeder robot uses the third information to format an API call to the host verification server associated with the third ID factor and submits the API call to the host verification server associated with the third ID factor,
wherein initiating access to the second controlled access application occurs responsive to receiving an indication of successful verification of the third ID factor and successful verification of the second ID factor.

17. A method comprising:
receiving a request from a user to access a controlled access application, the request including a first Identifier (ID) factor and a second ID factor and identifying the user;
selecting a first feeder robot configured to obtain first information for the first ID factor;
opening a first connection with a first host verification server associated with the first ID factor;
requesting, in an HTTP or HTTPS request, a first authentication user interface from the first host verification server via the first connection;
receiving, in an HTTP or HTTPS response, the first authentication user interface in response to the request, wherein the first authentication user interface is not presented to the user;
activating the first feeder robot to generate a first web form using the first information, at least some of the first information being information obtained from the user and some of the first information being information used to maintain the first connection that is extracted from the first authentication user interface;
generating a token for the feeder robot;
submitting the token and the first web form to the first host verification server, wherein submitting the first web form simulates a submission by the user and the token verifies to the host verification server that the feeder robot from the feeder robot is not a web-crawling robot;

receiving an indication of successful verification from the first host verification server;

closing the first connection with the first host verification server;

selecting a second feeder robot configured to obtain second information for the second ID factor;

opening a second connection with a second host verification server associated with the second ID factor;

requesting, in an HTTP or HTTPS request, a second authentication user interface from the second host verification server via the second connection;

receiving, in an HTTP or HTTPS response, the second authentication user interface in response to the request, wherein the second authentication user interface is not presented to the user;

activating the second feeder robot to generate a second web form using the second information, at least some of the second information being information obtained from the user and at least some of the second information being information used to maintain the second connection that is extracted from the second authentication user interface;

submitting the second web form to the second host verification server, wherein submitting the second web form simulates a submission by the user; and initiating, in response to receiving an indication of successful verification from the second host verification server, access to the controlled access application.

18. The method according to claim 17, wherein the first information includes information obtained from a data store for the user.

19. The method according to claim 17, wherein the information used to maintain the first connection includes status information.

20. The method according to claim 17, wherein the first information obtained from the user and the second information obtained from the user are obtained via a user interface provided by the controlled access application.

21. The method according to claim 17, wherein the information used to maintain the first connection includes a session identifier.

22. The method according to claim 17, wherein the first feeder robot and the first host verification server have a trusted relationship and the first host verification server lacks a relationship with the controlled access application.

23. The method according to claim 17, wherein the first feeder robot is configured to handle a workflow request issued by the first host verification server.

* * * * *

UNITED STATES PATENT AND TRADEMARK OFFICE
CERTIFICATE OF CORRECTION

| | | |
|---|---|---|
| PATENT NO. | : 9,961,070 B2 | Page 1 of 1 |
| APPLICATION NO. | : 14/851708 | |
| DATED | : May 1, 2018 | |
| INVENTOR(S) | : Zilong Tang | |

It is certified that error appears in the above-identified patent and that said Letters Patent is hereby corrected as shown below:

On the Title Page

On Page 2, Column 1, Item (56), under "U.S. PATENT DOCUMENTS", Entry 8, delete "Nets" and insert --Weis--, therefor.

In the Claims

In Column 19, Line 61, Claim 1, delete "robot," and insert --robot;--, therefor.

Signed and Sealed this
Twelfth Day of May, 2020

Andrei Iancu
*Director of the United States Patent and Trademark Office*